(12) United States Patent
Jaquish et al.

(10) Patent No.: US 10,031,898 B2
(45) Date of Patent: *Jul. 24, 2018

(54) SYSTEM AND METHOD TO PROVIDE A DOMAIN SPLIT DISPLAY

(71) Applicant: eBay Inc., San Jose, CA (US)

(72) Inventors: Matthew Jaquish, San Jose, CA (US); Nancy Silverstein, San Jose, CA (US); Ari Shapiro, Discovery Bay, CA (US); Krithivasan Nagarajan, San Jose, CA (US); Sudhakar Chintu, San Jose, CA (US); Hui Chen Vivian Lee, San Jose, CA (US); Hemal Doshi, San Jose, CA (US)

(73) Assignee: eBay Inc., San Jose, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 15/369,467

(22) Filed: Dec. 5, 2016

(65) Prior Publication Data

US 2017/0083489 A1    Mar. 23, 2017

Related U.S. Application Data

(63) Continuation of application No. 14/094,582, filed on Dec. 2, 2013, now Pat. No. 9,515,893, which is a
(Continued)

(51) Int. Cl.
*G06F 17/22*    (2006.01)
*H04L 12/24*    (2006.01)
(Continued)

(52) U.S. Cl.
CPC .......... *G06F 17/2247* (2013.01); *G06F 9/451* (2018.02); *G06F 17/212* (2013.01);
(Continued)

(58) Field of Classification Search
CPC .. G06F 17/2247; G06F 9/4443; G06F 17/212; G06F 17/227; G06F 9/451; H04L 41/22; H04L 63/10
See application file for complete search history.

(56) References Cited

U.S. PATENT DOCUMENTS 7,668,838 B2    2/2010  Baio et al.
8,108,771 B2    1/2012  Chijiiwa et al.
(Continued)

OTHER PUBLICATIONS

"U.S. Appl. No. 12/872,828, Response filed Feb. 11, 2013 to Final Office Action dated Nov. 9, 2012", 13 pgs.
(Continued)

*Primary Examiner* — Thu Huynh
(74) *Attorney, Agent, or Firm* — Wolfe-SBMC

(57) ABSTRACT

Systems and methods for a domain split display are provided. A first request call directed to a first domain is received. In response, a first response is transmitted to a client device, which causes generation of a parent page comprising a content iframe that is a child frame of the parent page. The parent page is associated with the first domain and the content iframe is associated with a second domain. A second request call directed to a second domain is received and a second response is transmitted to the client device. The second response causes a plurality of grandchild iframes to be generated within the content iframe, whereby a first grandchild iframe is associated with the first domain and a second grandchild iframe is associated with the second domain. The plurality of grandchild iframes are sibling iframes at a same level that are enabled to communicate with each other regardless of domain. The system causes resizing of the content iframe based on a communication of a size requirement between the first grandchild iframe and the second grandchild iframe and based on a communication of
(Continued)

the size requirement between the first grandchild iframe and the parent page.

20 Claims, 7 Drawing Sheets

Related U.S. Application Data continuation of application No. 12/872,828, filed on Aug. 31, 2010, now Pat. No. 8,601,364.

(60) Provisional application No. 61/238,639, filed on Aug. 31, 2009.

(51) Int. Cl.
    *G06F 17/21*    (2006.01)
    *H04L 29/06*    (2006.01)
    *G06F 9/451*    (2018.01)

(52) U.S. Cl.
    CPC ............ *G06F 17/227* (2013.01); *H04L 41/22* (2013.01); *H04L 63/10* (2013.01)

(56) References Cited

U.S. PATENT DOCUMENTS

| | | | |
|---|---|---|---|
| 8,601,364 B2 | 12/2013 | Jaquish et al. | |
| 9,436,763 B1* | 9/2016 | Gianos | G06F 17/30864 |
| 9,515,893 B2 | 12/2016 | Jaquish et al. | |
| 9,823,813 B2* | 11/2017 | Beechuk | G06F 3/0482 |
| 2004/0148571 A1 | 7/2004 | Lue | |
| 2007/0204423 A1 | 9/2007 | Keane | |
| 2007/0299857 A1 | 12/2007 | Gwozdz et al. | |
| 2008/0235604 A1 | 9/2008 | Ebert | |
| 2009/0037806 A1 | 2/2009 | Yang et al. | |
| 2009/0299862 A1 | 12/2009 | Fan et al. | |
| 2009/0328063 A1 | 12/2009 | Corvera et al. | |
| 2010/0017289 A1 | 1/2010 | Sah et al. | |
| 2010/0088761 A1 | 4/2010 | Podjarny et al. | |
| 2010/0185513 A1 | 7/2010 | Anderson et al. | |
| 2010/0299205 A1 | 11/2010 | Erdmann et al. | |
| 2011/0055685 A1 | 3/2011 | Jaquish et al. | |
| 2011/0321162 A1* | 12/2011 | Gluck | G06F 11/00 726/22 |
| 2012/0054596 A1 | 3/2012 | Kroger et al. | |
| 2014/0089788 A1 | 3/2014 | Jaquish et al. | |
| 2017/0126722 A1* | 5/2017 | Gluck | H04L 63/1425 |

OTHER PUBLICATIONS

"U.S. Appl. No. 12/872,828, Final Office Action dated Nov. 9, 2012", 15 pgs.
"U.S. Appl. No. 12/872,828, Non Final Office Action dated Jun. 22, 2012", 13 pgs.
"U.S. Appl. No. 12/872,828, Notice of Allowance dated Aug. 2, 2013", 6 pgs.
"U.S. Appl. No. 12/872,828, Response filed Sep. 24, 2012 to Non Final Office Action dated Jun. 22, 2012", 12 pgs.
"U.S. Appl. No. 14/094,582, Non Final Office Action dated Apr. 7, 2016", 9 pgs.
"U.S. Appl. No. 14/094,582, Notice of Allowance dated Aug. 3, 2016", 9 pgs.
"U.S. Appl. No. 14/094,582, Preliminary Amendment filed Mar. 3, 2014", 8 pgs.
"U.S. Appl. No. 14/094,582, Response filed Jul. 6, 2016 to Non Final Office Action dated Apr. 7, 2016", 10 pgs.

* cited by examiner

SYSTEM AND METHOD TO PROVIDE A DOMAIN SPLIT DISPLAY

CLAIM OF PRIORITY

This application is a continuation of U.S. patent application Ser. No. 14/094,582, filed on Dec. 2, 2013, which is a continuation of U.S. patent application Ser. No. 12/872,828, filed on Aug. 31, 2010, which claims the benefit of priority to U.S. Provisional Patent Application No. 61/238,639 filed on Aug. 31, 2009, all of which are incorporated herein by reference in their entireties.

FIELD

The present disclosure relates generally to displays, and in a specific example embodiment, to providing a domain split display.

BACKGROUND

When a user provides user-generated content (e.g., coded in HTML or JavaScript) on a second party website, a webpage is served that contains code from two different sources—a user-generated code and party code associated with the second party website. Furthermore, if the user provides malicious code, the provider of the webpage associated with the second party website may be perceived as culprit of the malicious code.

BRIEF DESCRIPTION OF DRAWINGS

Various ones of the appended drawings merely illustrate example embodiments of the present invention and cannot be considered as limiting its scope.

DETAILED DESCRIPTION

Figure 1:
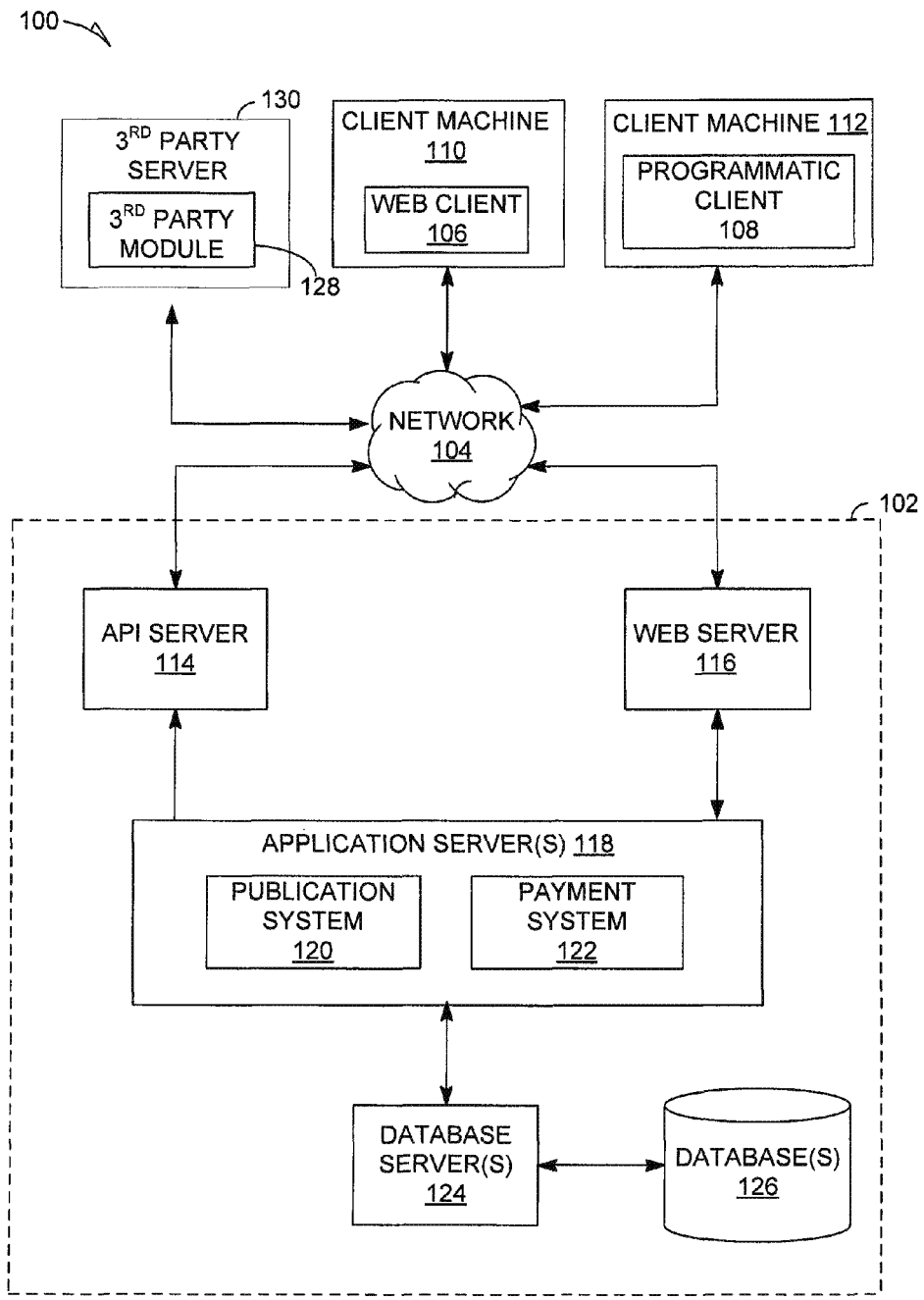
FIG. 1 is a block diagram illustrating an example embodiment of a network architecture of a system used to allow multi-directional visual browsing.

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

As used herein, the term "or" may be construed in either an inclusive or exclusive sense. Additionally, although various example embodiments discussed below focus on a network-based publication environment, the embodiments are given merely for clarity in disclosure. Thus, any type of electronic commerce or electronic business system and method, including various system architectures, may employ various embodiments of the domain split display system and method described herein and is considered as being within a scope of example embodiments. Each of a variety of example embodiments is discussed in detail, below.

To provide a perception that two separate portions of content (e.g., user-generated content and publication system content) form a single webpage, inline frames (herein referred to as "iframes") are used to display the user-generated content within the webpage that is associated with the publication system content. An iframe, typically, is an area within a webpage that allows display of information without reloading the entire page which may have the technical effect of reducing computing resources used by one or more devices within the system. Examples of such computing resources include, without limitation, processor cycles, network traffic, memory usage, storage space, and power consumption. Thus, the iframe allows another document (e.g., HTML document) to be placed within a frame of a webpage.

Conventionally, the iframe does not automatically resize to a window in which the iframe is embedded. As such, example embodiments comprise a mechanism to allow conveyance of a size of the iframe containing the user-generated content to a window in which the iframe is embedded, thus preserving the perception that the iframe and the window are a single webpage displaying content from a single source.

In various example embodiments, systems and methods for a domain split display are provided. A first request call directed to a first domain is received. In response, first served content is transmitted to a client device. The first served content comprises content retrieved based on the first domain. The first served content is used by the client device to generate a parent page comprising a content iframe, which is associated with a second domain.

A second request call directed to a second domain is received. In response, second served content is transmitted to the client device. The second served content comprises content retrieved from the second domain. The second served content is used by the client device to include a data receiver iframe and an event receiver iframe within the content iframe at the client device. The event receiver iframe is associated with the first domain and the data receiver iframe is associated with the second domain.

User-generated content for display in the data receiver iframe based on a further request call is transmitted. The user-generated content is retrieved from the second domain, whereby the second domain is different from the first domain. The data receiver iframe may communicate a size of the user-generated content to the event receiver iframe. In one embodiment, a hash containing size information of the user-generated content is appended to a URL of the event receiver iframe. The event receiver iframe is reloaded and the size read from the hashed URL. The size is then communicated from the event receiver iframe to the parent page. Resizing based on the size may then be performed whereby the parent page resizes the content iframe and the content iframe resizes the data receiver iframe.

With reference to FIG. 1, an example embodiment of a high-level client-server-based network architecture 100 to provide a domain split display is shown. A networked system 102, in an example form of a network-server-side functionality, is coupled via a network 104 (e.g., the Internet or Wide Area Network (WAN)) to one or more clients. FIG. 1 illustrates, for example, a web client 106 operating via a browser (e.g., such as the INTERNET EXPLORER® browser developed by Microsoft® Corporation of Redmond, Washington State) and a programmatic client 108 executing on, respectively, client devices 110 and 112. The client devices 110 and 112 may include, for example, a desktop computer, a laptop, or any other device capable of being communicatively coupled to the network 104. The client devices 110 and 112 may be associated with a user such as a buyer or a seller.

The network 104 over which the networked system 102 and the client devices 110 and 112 interact may be a Global System for Mobile Communications (GSM) network, an Internet Protocol (IP) network, a Wireless Application Protocol (WAP) network, a WiFi network, or a IEEE 802.11 standards network as well as various combinations thereof. Other conventional and/or later developed wired and wireless networks may also be used.

An Application Program Interface (API) server 114 and a web server 116 are coupled to, and provide programmatic and web interfaces respectively to, one or more application servers 118. The application servers 118 host a publication system 120 (e.g., a marketplace system, commerce system, a social networking system, or a search engine) and a payment system 122, each of which may comprise one or more modules, applications, or engines, and each of which may be embodied as hardware, software, firmware, or any combination thereof. The application servers 118 are, in turn, coupled to one or more database servers 124 facilitating access to one or more information storage databases or repositories 126. In one embodiment, the databases 126 are storage devices that store content, user preferences, user profiles, and any other type of data that is associated with the publication system 120.

The publication system 120 publishes content on a network (e.g., the Internet). As such, the publication system 120 provides a number of publication functions and services to users that access the networked system 102. Additionally, the publication system 120 comprises a domain split engine which enables a domain split display. The publication system 120 is discussed in more detail in connection with FIG. 2. In one embodiment, the publication system 120 is discussed in terms of a marketplace environment. However, it is noted that the publication system 120 may be associated with a non-marketplace environment (e.g., social networking environment).

The payment system 122 provides a number of payment services and functions to users. The payment system 122 allows users to accumulate value (e.g., in a commercial currency, such as the U.S. dollar, or a proprietary currency, such as "points") in accounts, and then later to redeem the accumulated value for products (e.g., goods or services) that are made available via the publication system 120. The payment system 122 also facilitates payments from a payment mechanism (e.g., a bank account, PayPal, or credit card) for purchases of items via the network-based publication system. While the publication system 120 and the payment system 122 are shown in FIG. 1 to both form part of the networked system 102, it will be appreciated that, in alternative embodiments, the payment system 122 may form part of a payment service that is separate and distinct from the networked system 102.

FIG. 1 also illustrates a third party module 128, executing on a third party server 130, as having programmatic access through the network 104 to the networked system 102 via the programmatic interface provided by the API server 114. For example, the third party module 128 may, utilizing information retrieved from the networked system 102, support one or more features or functions on a website (not shown) hosted by the third party. The third party, website may, for example, provide one or more promotional, marketplace, or payment functions that are supported by the relevant applications of the networked system 102.

While the network architecture 100 of FIG. 1 employs a client-server architecture, a skilled artisan will recognize that the present disclosure is not limited to such an architecture. The network architecture 100 can equally well find application in, for example, a distributed or peer-to-peer architecture system. The publication system 120 and payment system 122 may also be implemented as standalone systems or standalone software programs operating under separate hardware platforms, which do not necessarily have networking capabilities.

Figure 2:
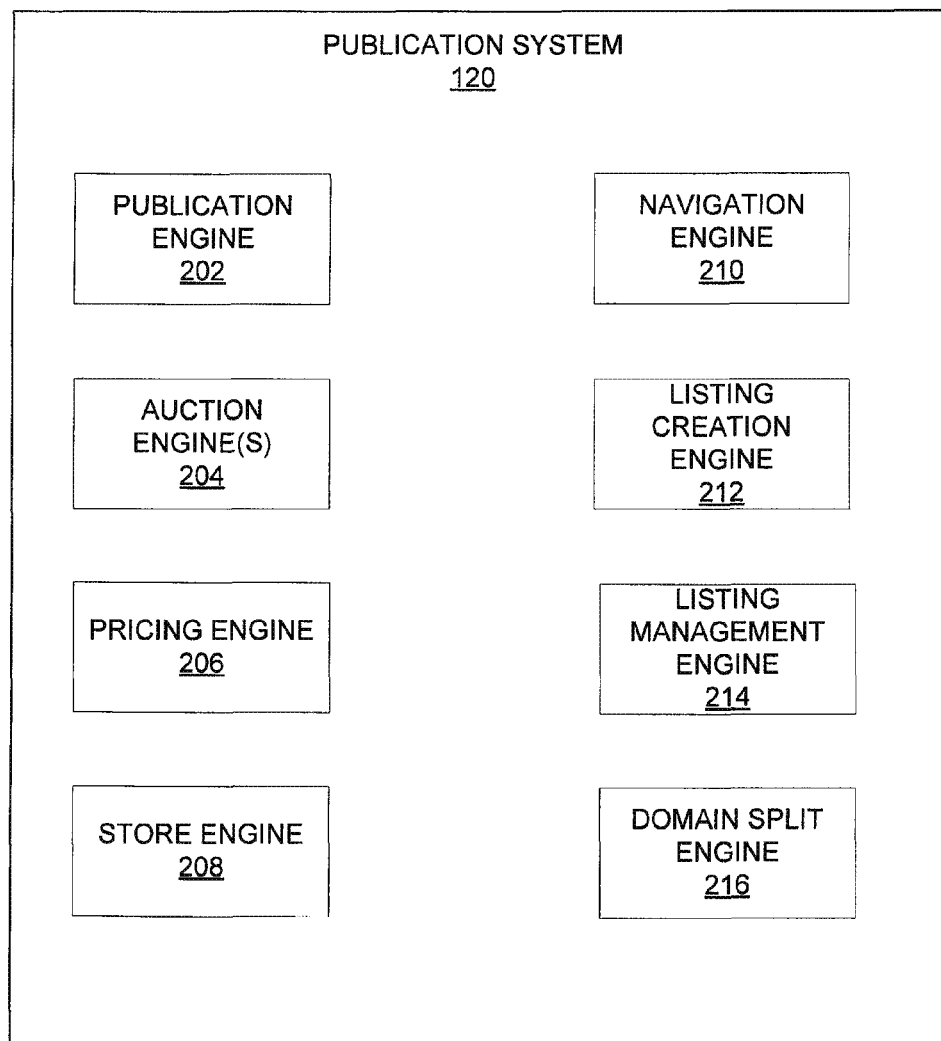
FIG. 2 is a block diagram illustrating an example embodiment of a publication system.

Referring now to FIG. 2, an example block diagram illustrating multiple components that, in one embodiment, are provided within the publication system 120 of the networked system 102 is shown. The publication system 120 may be hosted on dedicated or shared server machines (not shown) that are communicatively coupled to enable communications between the server machines. The multiple components themselves are communicatively coupled (e.g., via appropriate interfaces), either directly or indirectly, to each other and to various data sources, to allow information to be passed between the components or to allow the components to share and access common data. Furthermore, the components may access the one or more database(s) 126 via the one or more database servers 124, both shown in FIG. 1.

In one embodiment, the publication system 120 provides a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the publication system 120 may comprise a marketplace system having at least one publication engine 202 and one or more auction engines 204 that support auction-format listing and price setting mechanisms (e.g., English, Dutch, Chinese, Double, Reverse auctions, etc.). The various auction engines 204 also provide a number of features in support of these auction-format listings, such as a reserve price feature whereby a seller may specify a reserve price in connection with a listing and a proxy-bidding feature whereby a bidder may invoke automated proxy bidding.

A pricing engine 206 supports various price listing formats. One such format is a fixed-price listing format (e.g., the traditional classified advertisement-type listing or a catalogue listing). Another format comprises a buyout-type listing. Buyout-type listings (e.g., the Buy-It-Now (BIN) technology developed by eBay Inc., of San Jose, Calif.) may be offered in conjunction with auction-format listings and allow a buyer to purchase goods or services, which are also being offered for sale via an auction, for a fixed-price that is typically higher than a starting price of an auction for an item.

A store engine 208 allows a seller to group listings within a "virtual" store, which may be branded and otherwise personalized by and for the seller. Such a virtual store may also offer promotions, incentives, and features that are specific and personalized to the seller. In one example, the seller may offer a plurality of items as Buy-It-Now items in the virtual store, offer a plurality of items for auction, or a combination of both.

Navigation of the network-based publication system may be facilitated by a navigation engine 210. For example, a search module (not shown) of the navigation engine 212 enables keyword searches of item listings published via the publication system 120. In a further example, a browser module of the navigation engine 212 allows users to browse various category, catalogue, or inventory data structures according to which listings may be classified within the publication system 120. Various other navigation applications within the navigation engine 212 may be provided to supplement the searching and browsing applications.

A listing creation engine 212 allows sellers to conveniently author listings pertaining to goods or services that sellers wish to transact via the networked system 102. In some embodiments, the listing creation engine 216 automatically generate and post item listings based on information received from a merchandising application. In alternative embodiments, the listing creation engine 212 may allow users to author articles or other forms of publications for disseminating information.

A listing management engine 214 allows users or sellers to manage such listings. Specifically, where a particular user has authored or published a large number of listings, the management of such listings may present a challenge. The listing management engine 218 provides a number of features (e.g., auto-relisting, inventory level monitors, etc.) to assist the user in managing such listings.

A domain split engine 216 manages domain split displays involving user-generated content. The domain split engine 216 will be discussed in more detail in connection with FIG. 3.

Although the various components of the publication system 120 have been defined in terms of a variety of individual modules and engines, a skilled artisan will recognize that many of the items can be combined or organized in other ways. Furthermore, not all components of the publication system 120 have been included in FIG. 2. In general, components, protocols, structures, and techniques not directly related to functions of example embodiments (e.g., reputation engine, imaging engine, messaging engines, etc.) have not been shown or discussed in detail. The description given herein simply provides a variety of example embodiments to aid the reader in an understanding of the systems and methods used herein.

Figure 3:
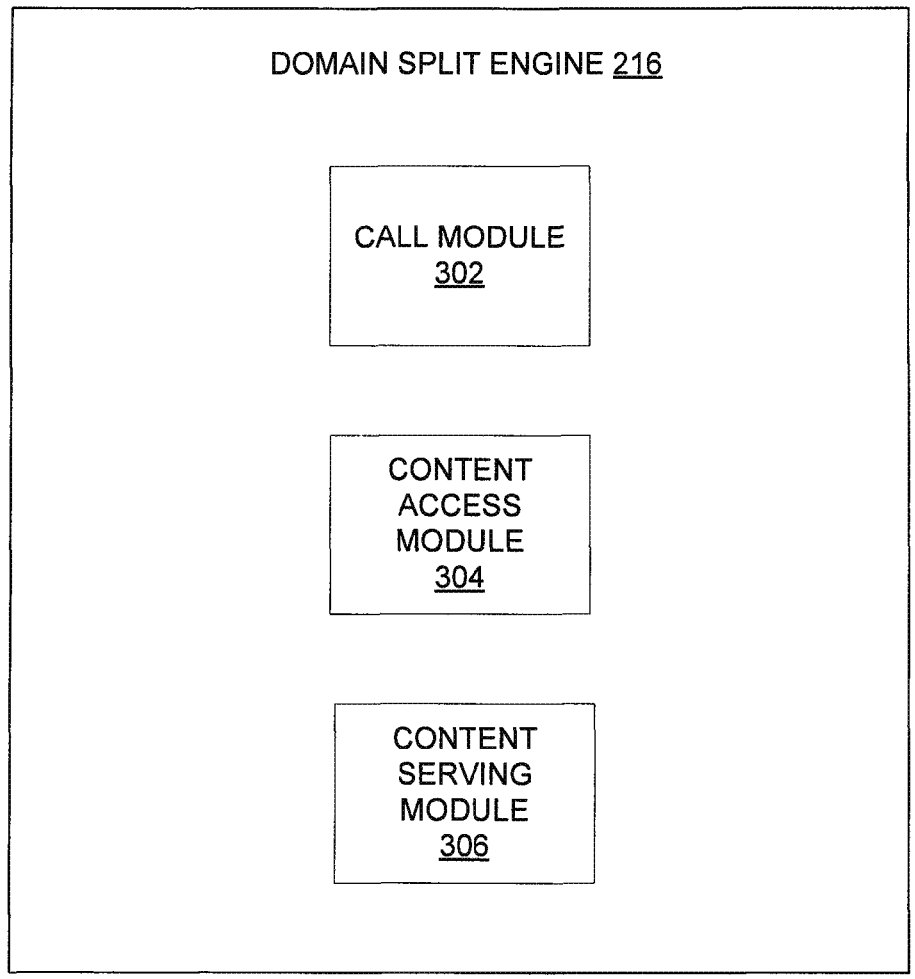
FIG. 3 is a block diagram illustrating an example embodiment of a domain split engine.

Application of Embodiments of the Domain Split Display Platform into the Example Network Architecture Referring now to FIG. 3, an example diagram of the domain split engine 216 is shown in more detail. The domain split engine 216 provides retrieved content and instructions (collectively referred to as "served content") to a browser of a client device (e.g., client machine 110). The instructions instruct the browser on how to combine user-generated content with content from the publication system 120 for display. In one embodiment, the instructions comprise instructions for creating iframes in example embodiments, the domain split engine 216 comprises a call module 302, a content access module 302, and a content serving module 306 communicatively coupled together. It should be noted, some of the components of the domain split engine 216 may be located elsewhere in the publication system 120 (e.g., in the publication engine 202 or the listing creation engine 212) or be combined into a single module.

The call module 302 receives calls for requested content from a browser of a client device and triggers the content access module 304 to obtain the associated content in response. In some embodiments, each call indicates a domain from which the requested content should be retrieved. The indicated domain is provided to the content access module 304 by the call module 302.

Using the indicated domain, the content access module 304 retrieves the requested content from one or more databases (e.g., databases 126). In example embodiments, the requested content comprises one or more of publication system content, user-generated content, or iframes containing further call instructions.

The user-generated content may be provided by a user to the content access module 304 or the listing creation engine 212. In one embodiment, the user-generated content may be, for example, coded in HTML or JavaScript. In some embodiments, the user-generated content is stored using a domain different from a domain associated with stored content generated by or otherwise associated with the publication system 120.

The content serving module 306 formats a response containing the served content (e.g., retrieved content and instructions). The response may be, for example, in JavaScript or HTML. In example embodiments, content serving module 306 adds formatting instructions to the response that instructs the browser to perform various functions e.g., include child iframes). The functions will be discussed in more detail below.

Figure 4:
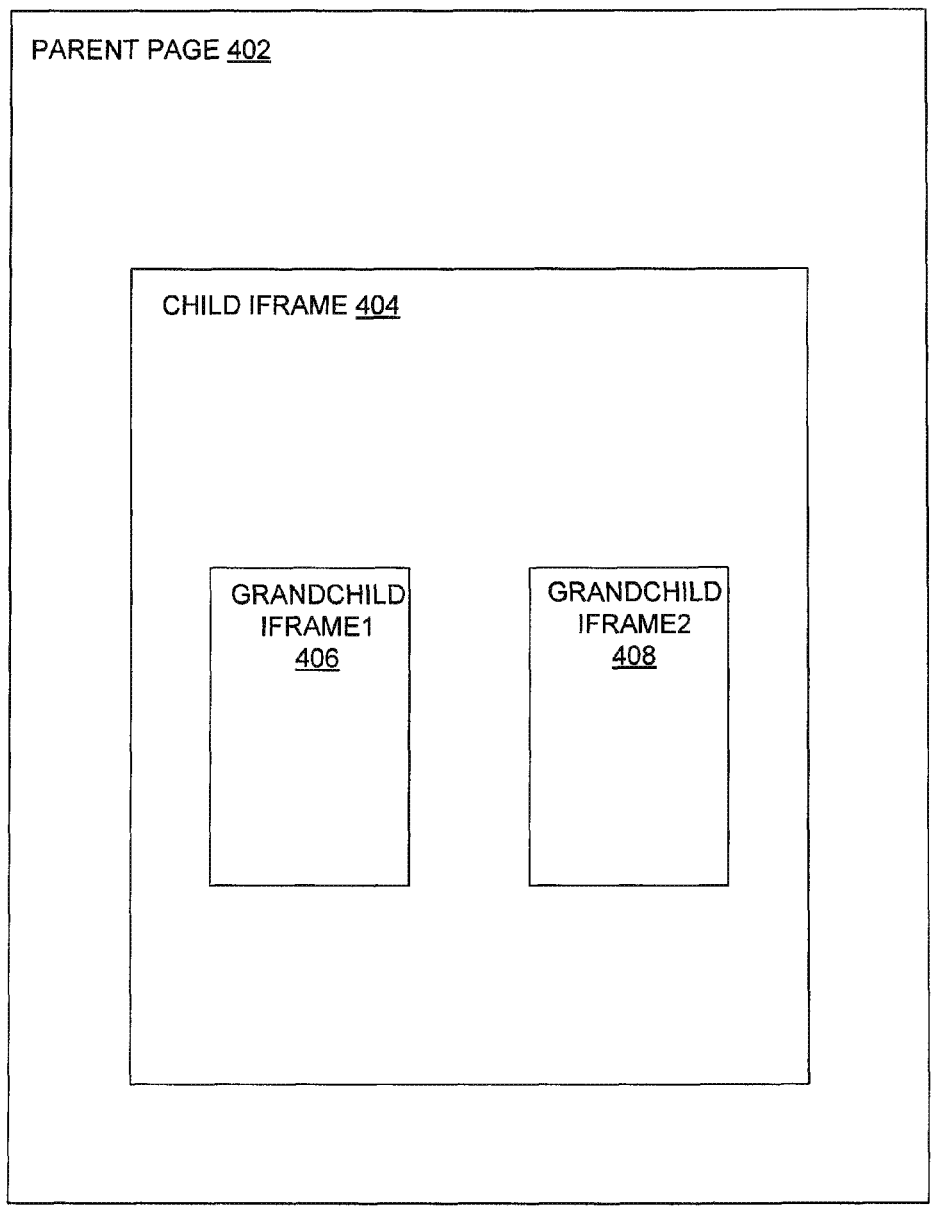
FIG. 4 is an example illustration of a display generated using embodiments of the present invention.

FIG. 4 is an example illustration of a display generated using embodiments of the present invention. As shown, a parent page 402 is a webpage associated with the publication system 120. For example, the parent page 402 may be associated with eBay, Inc. and comprise an item listing. As such, the parent page 402 may contain general information associated with the publication system 120 (e.g., eBay, Inc.). Such general information may include, for example, logos, tabs, general links, and any other content that is universally used on most or all webpages associated with the publication system 120.

Within the parent page 402, a child iframe 404 is provided. The child iframe 404 (also referred to as a "content iframe") is an area within the parent page 402 where user-generated content is displayed. Because of the desire to separate the user-generated content from the content of the publication system 120, the child iframe 404 comprises a different domain than that of the parent page 402. Continuing with the eBay example, the child iframe 404 comprises an item description of an item to be sold or auctioned on eBay. The eBay parent page contains content accessed via one domain (e.g., cgi.ebay.com), while the child iframe 404 contains user-generated content accessed via a different domain (e.g., vi.ebaydesc.com).

Current security policies of some browser applications only allow same domain communication on the client device. Thus, the parent page 402 does not have access to information regarding the state of the child iframe 404 because it is a different domain. As such, a mechanism to resize the child iframe 404 to fit appropriately within the parent page 402 is desired.

According to an example embodiment, grandchild iframe1 406 and grandchild iframe2 408 are provided within the child iframe 404. The grandchild iframe1 406 (also referred to as an "event receiver iframe") is in the same domain as the parent webpage 402, while the grandchild iframe2 408 (also referred to as a "content iframe") is in the same domain as the child iframe 404. Because the grandchild iframe1 406 and grandchild iframe2 408 are sibling iframes (e.g., on a same level), the grandchild iframe1 406 and grandchild iframe2 408 can communicate with each other. Continuing with the eBay example, the grandchild iframe1 406 has the same domain as the eBay parent page (e.g., cgi.ebay.com), while the grandchild iframe2 408 has the same domain as the child iframe 404 (e.g., vi.ebaydesc.com).

Accordingly, the grandchild iframe2 408, comprising the user-generated content, may communicate its size to the grandchild iframe1 406 due to the two grandchild iframes 406 and 408 being siblings. In response, the grandchild iframe1 406 communicates the size of the user-generated content in the grandchile iframe2 to the parent page 402 since the grandchild iframe 1 406 and the parent page 402 have the same domain. As a result, the parent page 402 can then resize the child iframe 404 to accommodate the user-generated content. Similarly, grandchild iframe2 408 communicates its size to child iframe 404 since the grandchild iframe2 408 and the child iframe 404 share the same domain. The child iframe 404 can, in turn, resize the grandchild iframe2 408 accordingly. The process of resizing will be discussed in more detail in connection with FIG. 6.

Figure 5:
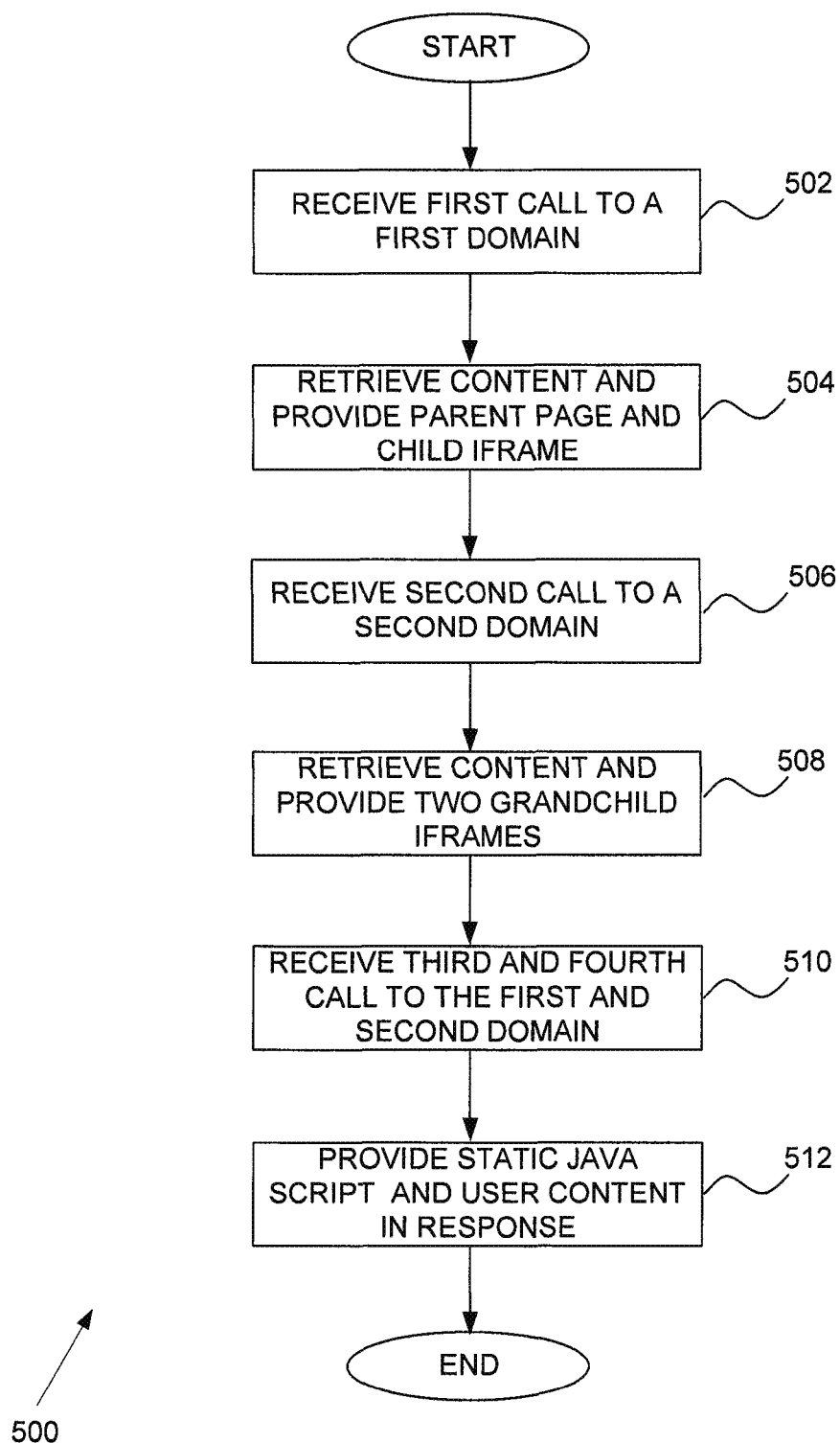
FIG. 5 is a flowchart of a method to provide domain split display.

FIG. 5 is a flowchart of a method 500 performed at a server to provide domain split display. In example embodiments, one or more servers (e.g., application servers 118) of the publication system 102 perform the method 500. At operation 502, a first call is received from a browser associated with a client device. In example embodiments, the first call is received by the call module 302 and references a first domain.

Using the first domain, corresponding content is retrieved from a database and returned to the browser at 504. In example embodiments, the content access module 304 retrieves the corresponding content using the first domain. The retrieved content may comprise general publication system content (e.g., logos, tabs, general links).

The retrieved content is then served along with instructions by the content serving module 306. In one embodiment, the content serving module 306 applies business logic and generates a HTML response to be served to the client device. The response includes formatting instructions in CSS (cascading style sheet and directives to include the child iframe either directly in HTML or using JavaScript. As such, the served content in operation 504 comprises data directed to parent page content and at least one child iframe.

The child iframe is associated with a second domain that is different from the first domain. Once received by the browser, a second call is performed by the browser to the second domain. The second call is received at operation 506. In one embodiment, the second call is received by the call module 302.

In operation 508, the content associated with the second domain is retrieved, for example, by the content access module 304. In example embodiments, the content retrieved is JavaScript that facilitates communications between the child iframe 404 and the grandchild iframe2 408. In some embodiments, the content associated with the second domain is retrieved from the same database or storage repository as with the first domain. In other embodiments, the content associated with the second domain may be stored in different databases or storage repositories.

The retrieved content for the second call is then returned along with instructions. In example embodiments, the content serving module 306 returns the retrieved content for the second call (e.g., the content associated with the second domain). The served content for the second call comprises formatting instructions to include at least two grandchild iframes as well as the JavaScript to facilitate communications. One of the grandchild iframes has the same domain as the parent page, while a second one or more of the grandchild iframes has the same domain as the child iframe.

At operation 510, a third and fourth call are received from the browser by the call module 302. The third call is based on a URL associated with the grandchild iframe having the same domain as the parent webpage. In response to this third call, static script (e.g., JavaScript) is returned at operation 512 by, for example, the content serving module 306. The static script may facilitate communications between the grandchild iframe1 406 and the parent page 402 as well as between the two grandchild iframes 406 and 408. The fourth call is based on a URL associated with the grandchild iframe having the same domain as the child iframe. In response to this fourth call, user-generated content is returned in operation 512 by the content serving module 306. For example, the user-generated content may comprise description data from a description table of the database for a particular item or product of interest.

It is noted that instructions for performing functions at the browser, such as size determination, relaying of size information, hashing, reloading of a hashed URL, and resizing, as will be discussed in more detail in connection with FIG. 6, may be transmitted with the served content in operations 508-512. In one embodiment, these instructions are provided by the content serving module 306. That is, for example, the served content results in snippets of JavaScript in each of the iframes that work together to enable the sizing determination, relaying of size information, hashing, reloading of the hashed URL, resizing, and any other functions related to example embodiments described herein.

Figure 6:
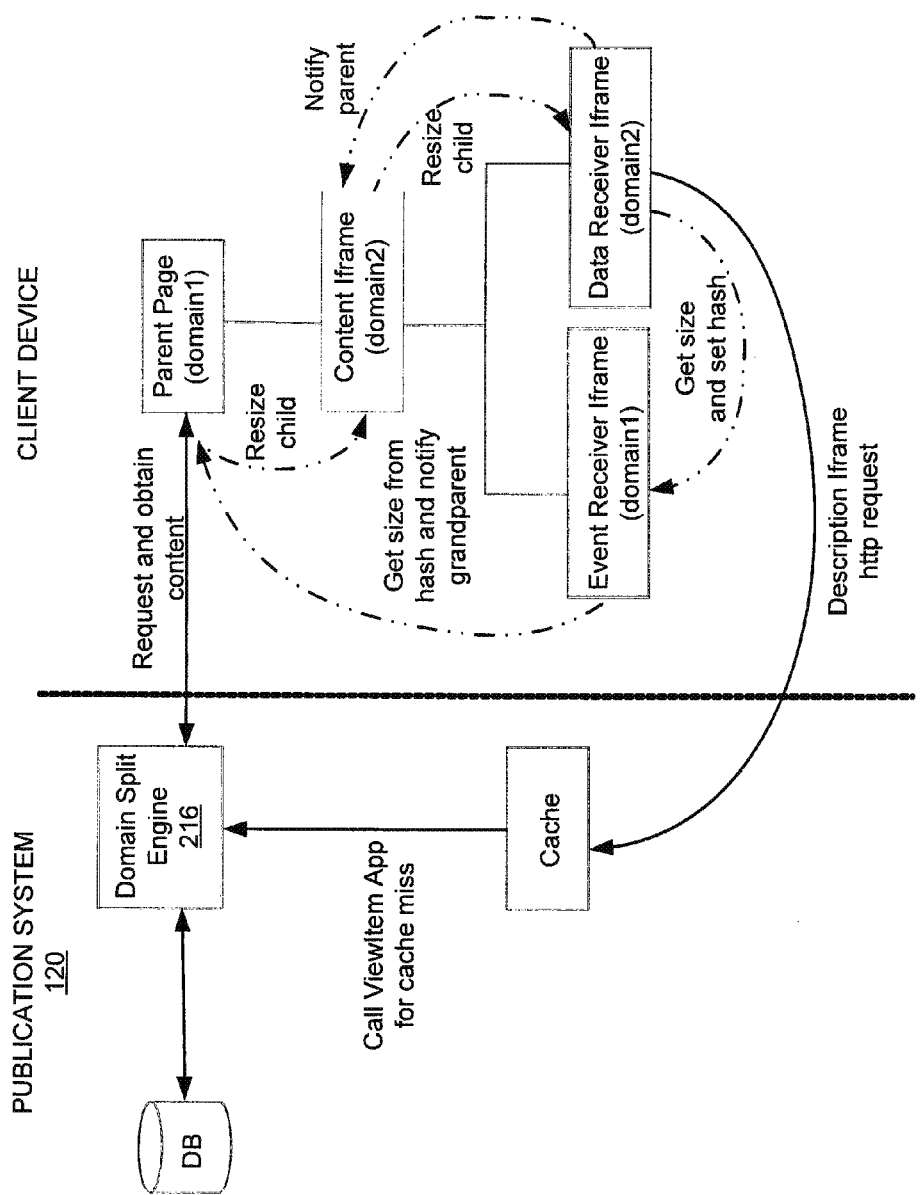
FIG. 6 is a diagram illustrating a flow of information for a domain split display.

FIG. 6 is a diagram illustrating a flow of information for a domain split display. Initially, a browser at the client device sends a request for content to the domain split engine 216. The request for content uses a first domain indicated as "domain1." The call module 302 of the domain split engine 216 receives the request for content. The call module 302 then triggers the content access module 304 to retrieve the corresponding content associated with domain1. Subsequently, the content serving module 306 serves the retrieved content and instructions. In example embodiments, the served content (e.g., the retrieved content and instructions) generates a parent page at the client device. The served content may include data from the publication system 120 and instructions to generate a child iframe.

Content for the content iframe is served from a second domain (domain2) that is a different domain than that of the parent page (e.g., domain1). Using domain2, a second call is made by the browser to the domain split engine 216 to obtain content for the child iframe. The call module 302 receives the second call and triggers the content access module 304 to retrieve the corresponding content associated with domain2. Subsequently, the content serving module 306 serves the retrieved content. In example embodiments, the served content of the second call comprises instructions for generating at least two grandchild iframes. One of the grandchild iframes is an event receiver iframe having the same domain as the parent page (e.g., domain1). One or more further iframes (also known as a "data receiver iframe") have the same domain as the child iframe (e.g., domain2).

Further calls are made based on the URLs associated with the event receiver iframe and the data receiver iframe. A third call is based on a URL associated with the event receiver iframe (having the same domain as the parent webpage). In response to this third call, static script (e.g., JavaScript) is returned by the content serving module 306. A fourth call is based on a URL associated with the data receiver iframe (having the same domain as the child iframe). In response to this fourth call, user-generated content is returned by the content serving module 306.

Once the user-generated content is loaded in the data receiver iframe, a determination of a size required to display the user-generated content is performed. The data receiver iframe may then communicate the size information to the event receiver iframe. In one embodiment, the URL of the event receiver iframe is changed to include the size information. In example embodiments, URL fragment identifiers may be used to communicate cross-domain with iframes. Thus, a change to the URL may be performed by using a hash appendage. For example, if the event receiver iframe URL is cgi.ebay.com/item=123, then the hashed domain may be cgi.ebay.com/item=123/ht2307wt1182 (e.g., height is 2307 pixels and width is 1182 pixels).

The event receiver iframe then reloads and reads the size from the changed (hashed) URL. Once this is performed, the event receiver iframe knows the size of the data receiver iframe. The event receiver iframe may then communicate the size to the parent page. Similarly, the data receiver iframe may communicate its size to the content iframe.

Each parent iframe can resize their child iframe. As such, the parent page may resize the content iframe, if needed. In turn, the content iframe, which also knows the size of its child iframe (e.g., the data receiver iframe) may resize the data receiver iframe.

Modules, Components, and Logic

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine-Readable Medium

Figure 7:
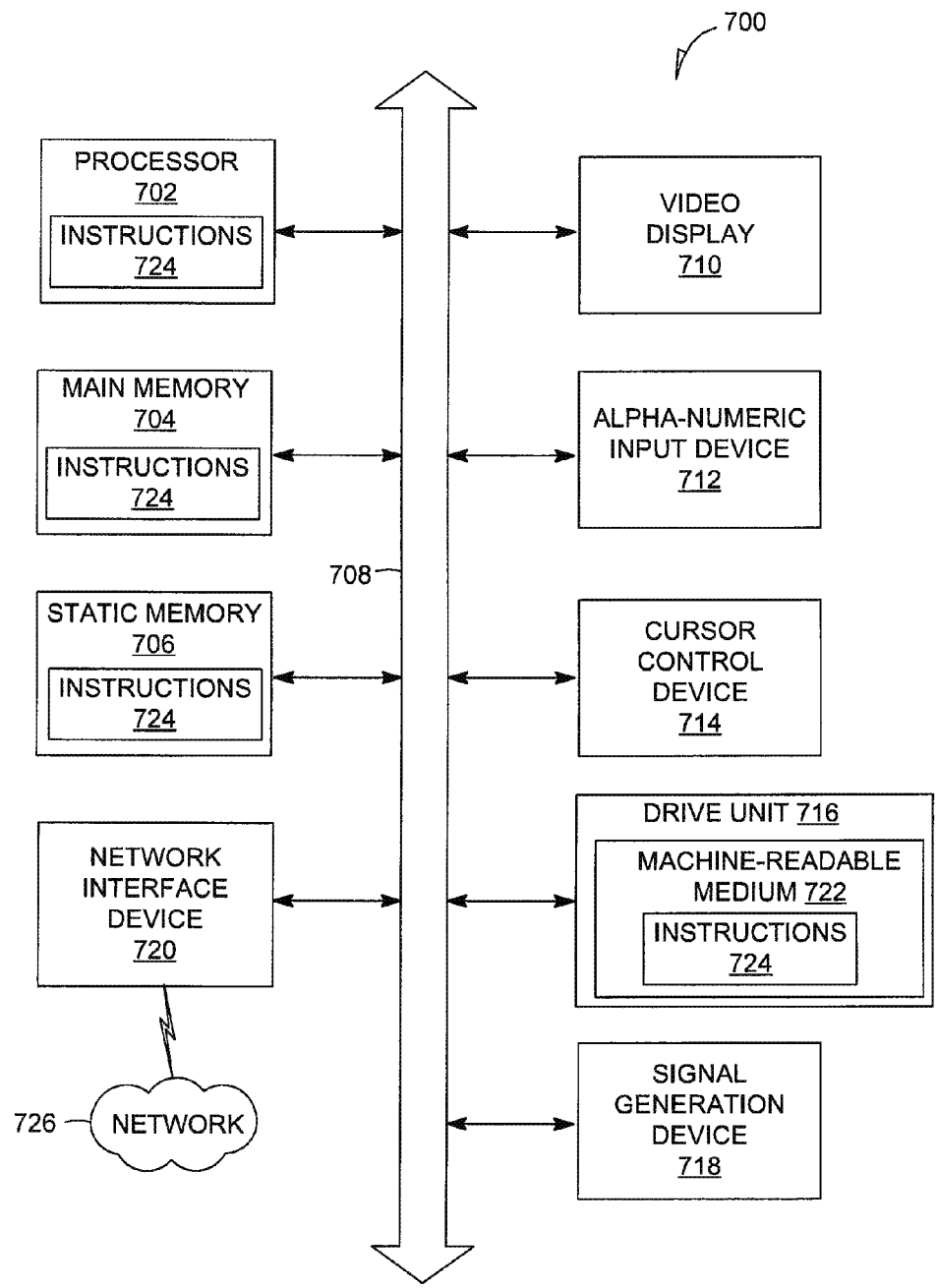
FIG. 7 is a simplified block diagram of a machine in an example form of a computing system within which a set of instructions for causing the machine to perform any one or more of the methodologies discussed herein may be executed.

With reference to FIG. 7, an example embodiment extends to a machine in the example form of a computer system 700 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 may include a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). In example embodiments, the computer system 700 also includes one or more of an alpha-numeric input device 712 (e.g., a keyboard), a user interface (UI) navigation device or cursor control device 714

(e.g., a mouse), a disk drive unit 716, a signal generation device 718 (e.g., a speaker), and a network interface device 720.

Machine-Readable Storage Medium

The disk drive unit 716 includes a machine-readable storage medium 722 on which is stored one or more sets of instructions 724 and data structures (e.g., software instructions) embodying or used by any one or more of the methodologies or functions described herein. The instructions 724 may also reside, completely or at least partially, within the main memory 704 or within the processor 702 during execution thereof by the computer system 700, the main memory 704 and the processor 702 also constituting machine-readable storage media. In example embodiments, the machine-readable storage medium is anon-transitory machine-readable storage medium.

While the machine-readable storage medium 722 is shown in an example embodiment to be a single medium, the term "machine-readable storage medium" may include a single medium or multiple media (e.g., a centralized or distributed database, or associated caches and servers) that store the one or more instructions. The term "machine-readable storage medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks; magneto-optical disks; and CD-ROM and DVD-ROM disks.

Transmission Medium

The instructions 724 may further be transmitted or received over a communications network 726 using a transmission medium via the network interface device 720 and utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method to provide a domain split display, the method comprising:

receiving a first request call directed to a first domain;

transmitting a first response to a client device in response to the first request call, the first response comprising retrieved content associated with the first domain, the first response to generate a parent page comprising a content iframe that is a child frame of the parent page, the parent page being associated with the first domain and the content iframe being associated with a second domain;

receiving a second request call directed to the second domain;

transmitting, by a hardware processor, a second response to the client device based on the second request call, the second response causing a plurality of grandchild iframes of the parent page to be generated within the content iframe, a first grandchild iframe of the plurality of the grandchild iframes being associated with the first domain and a second grandchild iframe of the plurality of the grandchild iframes being associated with the second domain, the plurality of grandchild iframes being sibling iframes at a same level within the parent page that are enabled to communicate with each other regardless of domain; and causing resizing, by the parent page, of the content iframe based on a communication of a size requirement between the first grandchild iframe and the second grandchild iframe and based on a communication of the size requirement between the first grandchild iframe and the parent page.

2. The method of claim 1, further comprising:

receiving a third request call to the first domain and a fourth request call to the second domain;

serving first further content for the first grandchild iframe in response to the third request call; and serving second further content retrieved based on the second domain for display in the second grandchild iframe in response to the fourth request call.

3. The method of claim 2, wherein the first further content comprises script that facilitates the communication between the first grandchild iframe and the parent page and between the first grandchild iframe and the second grandchild iframe.

4. The method of claim 2, wherein the second further content comprises user-generated content.

5. The method of claim 1, further comprising causing resizing, by the content iframe, of the second grandchild iframe.

6. The method of claim 5, wherein the causing resizing of the second grandchild iframe is based on a communication between the second grandchild iframe and the content iframe indicating a size of the second grandchild iframe.

7. The method of claim 1, wherein the second response comprises script that facilitates communications between the content iframe and the second grandchild iframe.

8. The method of claim 1, further comprising generating the first response to the first request call, the generating including formatting instructions in cascading style sheet (CSS) and directives to include the content iframe.

9. A hardware storage device storing instructions that, when executed by one or more processors of a machine, cause the machine to perform operations comprising:
receiving a first request call directed to a first domain;
transmitting a first response to a client device in response to the first request call, the first response comprising retrieved content associated with the first domain, the first response to generate a parent page comprising a content iframe that is a child frame of the parent page, the parent page being associated with the first domain and the content iframe being associated with a second domain;
receiving a second request call directed to the second domain;
transmitting a second response to the client device based on the second request call, the second response causing a plurality of grandchild iframes of the parent page to be generated within the content iframe, a first grandchild iframe of the plurality of the grandchild iframes being associated with the first domain and a second grandchild iframe of the plurality of the grandchild iframes being associated with the second domain, the plurality of grandchild iframes being sibling iframes at a same level within the parent page that are enabled to communicate with each other regardless of domain; and
causing resizing, by the parent page, of the content iframe based on a communication of a size requirement between the first grandchild iframe and the second grandchild iframe and based on a communication of the size requirement between the first grandchild iframe and the parent page.

10. The hardware storage device of claim 9, wherein the operations further comprise:
receiving a third request call to the first domain and a fourth request call to the second domain;
serving first further content for the first grandchild iframe in response to the third request call; and
serving second further content retrieved based on the second domain for display in the second grandchild iframe in response to the fourth request call.

11. The hardware storage device of claim 10, wherein the first further content comprises script that facilitates the communication between the first grandchild iframe and the parent page and between the first grandchild iframe and the second grandchild iframe.

12. The hardware storage device of claim 10, wherein the second further content comprises user-generated content.

13. The hardware storage device of claim 9, wherein the operations further comprise causing resizing, by the content iframe, of the second grandchild iframe.

14. The hardware storage device of claim 13, wherein the causing resizing of the second grandchild iframe is based on a communication between the second grandchild iframe and the content iframe indicating a size of the second grandchild iframe.

15. A system comprising:
one or more hardware processors; and
a storage device storing instructions that, when executed by the one or more hardware processors, causes the one or more hardware processors to perform operations comprising:
receiving a first request call directed to a first domain;
transmitting a first response to a client device in response to the first request call, the first response comprising retrieved content associated with the first domain, the first response to generate a parent page comprising a content iframe that is a child frame of the parent page, the parent page being associated with the first domain and the content iframe being associated with a second domain;
receiving a second request call directed to the second domain;
transmitting a second response to the client device based on the second request call, the second response causing a plurality of grandchild iframes of the parent page to be generated within the content iframe, a first grandchild iframe of the plurality of the grandchild iframes being associated with the first domain and a second grandchild iframe of the plurality of the grandchild iframes being associated with the second domain, the plurality of grandchild iframes being sibling iframes at a same level within the parent page that are enabled to communicate with each other regardless of domain; and
causing resizing, by the parent page, of the content iframe based on a communication of a size requirement between the first grandchild iframe and the second grandchild iframe and based on a communication of the size requirement between the first grandchild iframe and the parent page.

16. The system of claim 15, wherein the operations further comprise:
receiving a third request call to the first domain and a fourth request call to the second domain;
serving first further content for the first grandchild iframe in response to the third request call; and
serving second further content retrieved based on the second domain for display in the second grandchild iframe in response to the fourth request call.

17. The system of claim 16, wherein the first further content comprises script that facilitates the communication between the first grandchild iframe and the parent page and between the first grandchild iframe and the second grandchild iframe.

18. The system of claim 16, wherein the second further content comprises user-generated content.

19. The system of claim 15, wherein the operations further comprise causing resizing, by the content iframe, of the second grandchild iframe.

20. The system of claim 19, wherein the causing resizing of the second grandchild iframe is based on a communication between the second grandchild iframe and the content iframe indicating a size of the second grandchild iframe.

* * * * *